H. BLUMENBERG, Jr.
PRIMER FOR INTERNAL COMBUSTION ENGINES.
APPLICATION FILED AUG. 4, 1919.
1,375,820.                     Patented Apr. 26, 1921.
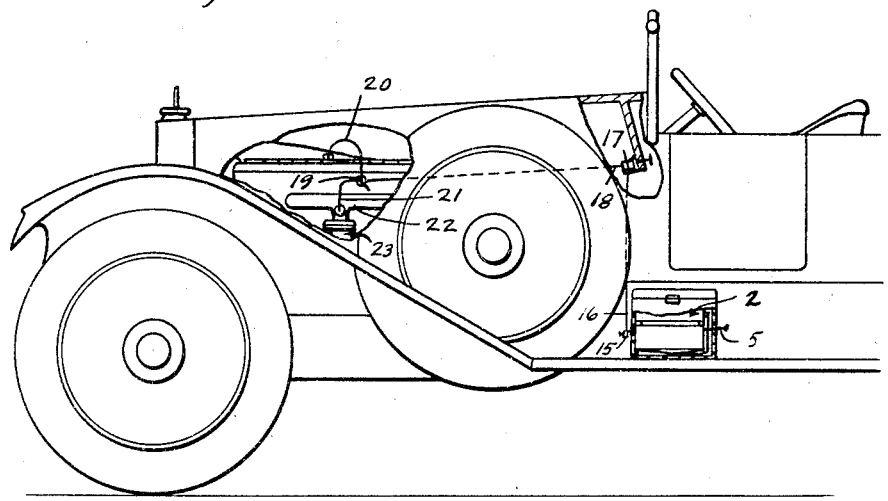
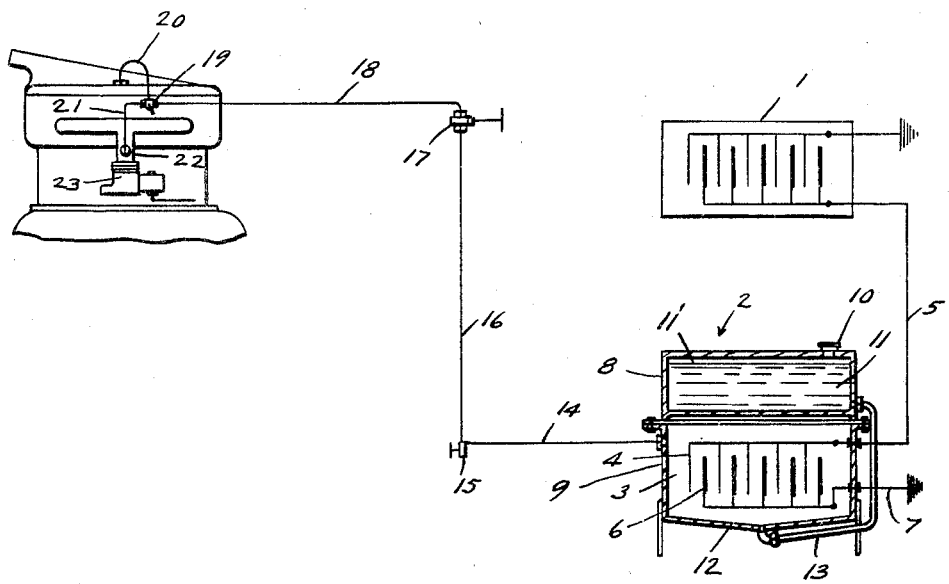
INVENTOR.
Henry Blumenberg, Jr.
BY
ATTORNEYS.

UNITED STATES PATENT OFFICE.

HENRY BLUMENBERG, JR., OF BARSTOW, CALIFORNIA, ASSIGNOR TO JOHN H. BLUMENBERG, OF HUNTINGTON PARK, CALIFORNIA.

PRIMER FOR INTERNAL-COMBUSTION ENGINES.

1,375,820.      Specification of Letters Patent.      Patented Apr. 26, 1921.

Application filed August 4, 1919. Serial No. 315,277.

*To all whom it may concern:*

Be it known that I, HENRY BLUMENBERG, Jr., a citizen of the United States, residing at Barstow, in the county of San Bernardino and State of California, have invented new and useful Improvements in Primers for Internal-Combustion Engines, of which the following is a specification.

My invention relates to a primer to assist in starting an internal combustion engine for motor vehicles and the like.

It is an object of this invention to facilitate the starting of an internal combustion engine by furnishing for the initial starting a highly explosive gaseous mixture such as hydrocarbon and oxygen, the explosion of which, as is well known, may be effected by an electric spark having approximately a temperature of only 800° F.

This invention is especially useful for automobile engines in cold weather, or engines which burn liquid fuel heavier than gasolene.

The specific object of this invention is to provide an apparatus which will automatically generate the explosive mixture so that a supply of the explosive gas is always on hand sufficient in quantity to start the engine until either the cold engine is warmed up, or, in case of engines using a heavier fuel, the heavier fuel may be used.

The apparatus is so arranged that the generation of the gas automatically stops when a predetermined quantity of the gas has been generated, and automatically operates when the supply of gas falls below the predetermined quantity. The gas generator is preferably operated from a storage battery, although the gas may be generated by chemical means. The gas supply chamber is connected to the combustion chamber of an engine and under the control of the operator.

My invention consists in the combination, construction and arrangement of parts hereinafter described and claimed.

In the accompanying drawings, which form a part of this specification,

Figure 1 is a fragmentary side elevation of a motor vehicle provided with an engine primer in accordance with the principles of my invention, and Fig. 2 is a diagrammatic view of the engine primer shown in Fig. 1.

The storage battery 1 may be an independent storage battery or it may be the storage battery ordinarily used upon a motor vehicle for starting the engine, lighting, and so on.

The gas generator 2 has a generating chamber 3 with a series of electrodes 4 mounted in the chamber and connected to the battery 1 by a line 5, and a second series of electrodes 6 mounted in the chamber 3 and arranged alternately with the electrodes 4 and grounded by a line 7. The electrodes 4 and 6 are preferably made of carbon.

The liquid tank 8 is mounted upon the casing 9 containing the chamber 3 and has a filling nipple 10 leading to the liquid chamber 11. A sump or settling basin 12 is formed at the bottom of the casing 9, and a pipe 13 connects the sump 12 to the bottom of the chamber 11, so that when the chamber 3 is empty except for the electrodes 4 and 6 and the chamber 11 is filled with a suitable electrolyte, such as an aqueous zinc sulfate solution 11', the latter will run through the pipe 13 into the chamber 3 and flood the electrodes 4 and 6 and make an electrical connection between the electrodes, so that the electric current will flow over the line 5 through the solution between the electrodes to the ground line 7 and the flow of electric current will generate oxygen at the anode and hydrogen at the cathode and these gases will collect in the upper part of the chamber 3, and as the gases are collected, the pressure of the gases will force the solution backwardly through the pipe 13 to the chamber 11, and when the solution no longer provides a current conducting medium the electric current will cease to flow over the line 5.

A pipe 14 leads from the upper part of the chamber 3 to a drain cock 15 and from the drain cock 15 a pipe 16 leads to the valve 17 which may be mounted upon the instrument board, and a pipe 18 leads to the two-way valve 19 which may be mounted near the engine, and a branch pipe 20 leads from the two-way valve 19 into one of the explosion chambers of the engine, and a second branch pipe 21 leads from the two-way valve 19 into the manifold 22 above the carbureter 23.

In the practical operation with the valves 15, 17 and 19 closed the chamber 3 will be filled with oxyhydrogen, and when the valve 19 is properly turned and the valve 17 opened the gas will flow through the branch pipe 20 into one of the explosion chambers of the engine, and then if the spark plug is sparking the gas will explode and start the engine, and if the parts are not in proper position for this to take place the engine crank shaft may be turned over by hand or by a self starter until the explosion takes place. If the valve 19 is turned the other way the gas will pass through the branch pipe 21 into the intake manifold 22 and as soon as the crank shaft is turned over the engine will start.

If desired, the gas may be connected to each of the explosion chambers, or the connections to the explosion chambers may be omitted and the gas connected only to the intake manifold.

I have shown and described the generation of the oxyhydrogen by means of a direct current furnished by a storage battery.

The zinc sulfate solution is of a degree of strength to furnish the necessary resistance to the electric current so that demands upon the storage battery may not be excessive. The generation of the oxyhydrogen proceeds very quickly and the operator keeps the valve 17 open until the engine is fairly started and able to go on with the fuel intended for its use. As soon as the valve 17 is closed the oxyhydrogen will collect in the upper part of the chamber 3 and the pressure thereof will gradually force the electrolyte into the chamber 11. When the level of the electrolyte falls so that it can act no longer as a conducting medium between the anode and the cathods the generation of the oxyhydrogen will immediately cease.

In place of using an electric current for generating the oxyhydrogen, a hydrogen generator may be substituted in which the hydrogen is generated by chemical means. For instance, in place of the electrodes, a suitable metal, such as zinc, may be placed in the chamber 3 and a dilute acid such as sulfuric acid may be placed in the chamber 11, which, coming in contact with the zinc, will generate hydrogen, the pressure of which will gradually force the sulfuric acid out of contact with the zinc, out of the chamber 3, and into the chamber 11. In this case of course it is necessary to operate the throttle valve of the carbureter, or to provide an auxiliary air inlet in the intake manifold in order to furnish the necessary oxygen for the hydrogen to form the explosive mixture.

I also contemplate the use of acetylene by providing an acetylene generator, which, after generating a predetermined quantity of acetylene, will cease to function, and become operative again when the supply of acetylene is drawn upon.

I prefer to use the electric current as shown and described, for the reason that it generates a perfect explosive gas mixture undiluted with the nitrogen of the air.

I have shown and described the valve 17 controlling the passage of the gas from the gas generator to the engine as being under the manual control of the operator. It is obvious, however, that my invention is not limited to such a construction as this valve may be connected to the starting system of an automobile in such a manner that after the engine is under way by its own power, derived from the fuel intended for its use, it will be automatically closed, similar in action to the electric starting motors, which, after the engine is running under its own power, automatically disconnects the starting gear from the fly wheel of the engine.

Various changes may be made in the combination, construction and arrangement of parts by those skilled in the art without departing from the spirit of my invention as claimed.

I claim:

1. The combination with the combustion chamber of an internal combustion engine, of a source of electric energy, a gas generator having means for storing a quantity of electrolyte for use in generating a combustible gas, said generator having a chamber adapted to admit the electrolyte to the gas chamber, thereby turning on an electric current, and adapted to expel the electrolyte from the gas chamber by the pressure of the gas, thereby turning off the electric current, a passage leading from the gas generator to the combustion chamber, and single means under the control of the operator for closing said passage, whereby the supply to the combustion chamber is cut off and generation of the gas is discontinued.

2. The combination with an internal combustion engine, of a casing forming a chamber adapted for containing an electrolyte for use in generating an explosive gaseous mixture, electrodes mounted in the chamber, an electric circuit connected to the electrodes, a reservoir for the electrolyte, means connecting the reservoir to the lower part of the casing, a conduit leading from the upper part of the casing to the explosion chamber of an internal combustion engine, the reservoir being placed in such a position that when the electrolyte is placed therein it will flow into the casing and establish a conducting medium between the electrodes, and when the gas is confined in the casing it will expel the electrolyte from the casing to the reservoir and thus open the electric circuit, and a valve in the conduit under the control of the operator, whereby the supply to the explosion chamber may be cut off and the generation of the gas be discontinued, 3. The combination with the combustion chamber of an internal combustion engine, of a gas generator having means for storing a quantity of electrolyte for use in generating a combustible gas, said generator having a chamber adapted to admit the electrolyte to the gas chamber and to expel the electrolyte from the gas chamber by the pressure of the gas; means for passing an electric current through the electrolyte; a passage leading from the gas generator to the combustion chamber, and a single means under the control of the operator for closing said passage and simultaneously causing the generation of the gas to be discontinued.

In testimony whereof I have signed my name to this specification.

HENRY BLUMENBERG, Jr.